(12) United States Patent
Callahan et al.

(10) Patent No.: US 7,597,286 B2
(45) Date of Patent: Oct. 6, 2009

(54) SIMPLIFIED POWER SYSTEM FOR A CABIN SERVICES SYSTEM FOR AN AIRCRAFT

(75) Inventors: Kevin S. Callahan, Shoreline, WA (US); Trevor M. Laib, Woodinville, WA (US); Bret L. Lamoree, Woodinville, WA (US); Donald B. Lee, Shoreline, WA (US); Bradley J. Mitchell, Snohomish, WA (US); William C. Sanford, Mukilteo, WA (US)

(73) Assignee: Boeing Company, Chicago, IL (US)

( * ) Notice: Subject to any disclaimer, the term of this patent is extended or adjusted under 35 U.S.C. 154(b) by 514 days.

(21) Appl. No.: 11/303,498

(22) Filed: Dec. 16, 2005

(65) Prior Publication Data

US 2007/0057121 A1    Mar. 15, 2007

(51) Int. Cl.
*B64D 11/00* (2006.01)
*H01R 3/00* (2006.01)

(52) U.S. Cl. ..................... 244/118.5; 439/94
(58) Field of Classification Search .............. 244/118.5; 174/97, 48; 362/404; 439/94, 110, 121, 439/527
See application file for complete search history.

(56) References Cited

U.S. PATENT DOCUMENTS

| | | | |
|---|---|---|---|
| 3,391,377 A * | 7/1968 | Corl et al ..................... 439/116 |
| 4,756,528 A | 7/1988 | Umashankar | |
| 4,774,514 A * | 9/1988 | Hildebrandt et al. ........ 340/971 |
| 4,853,555 A * | 8/1989 | Wheat ......................... 307/9.1 |
| 4,881,907 A * | 11/1989 | Bergman et al. ............. 439/111 |
| 5,007,420 A | 4/1991 | Bird | |
| 5,145,128 A | 9/1992 | Umeda | |
| 5,651,733 A | 7/1997 | Schumacher | |
| 5,743,487 A * | 4/1998 | Rice ........................... 244/1 R |
| 5,835,127 A | 11/1998 | Booth et al. | |
| 5,931,874 A | 8/1999 | Ebert et al. | |
| 6,393,343 B1* | 5/2002 | Frey et al. ....................... 701/3 |
| 6,424,386 B1 | 7/2002 | Shimizu | |
| 6,871,356 B2 | 3/2005 | Chang | |
| 7,083,437 B2* | 8/2006 | Mackness ................... 439/110 |
| 7,114,171 B2 | 9/2006 | Brady et al. | |
| 7,280,166 B2 | 10/2007 | Nagata et al. | |
| 2003/0160706 A1 | 8/2003 | Endress et al. | |
| 2003/0194967 A1 | 10/2003 | Sanford et al. | |
| 2004/0098745 A1 | 5/2004 | Marston et al. | |
| 2004/0235469 A1 | 11/2004 | Krug | |

OTHER PUBLICATIONS

Non-Final Office Action for Patent Application No. 11/303,652, mailed Aug. 4, 2008, 19 pages.
Non-Final Office Action for Patent Application No. 11/303,498, mailed Dec. 5, 2008, 6 pages.
Non-Final Office Action for Patent Application No. 11/303,652, mailed Feb. 12, 2008, 18 pages.

* cited by examiner

*Primary Examiner*—Tien Dinh
(74) *Attorney, Agent, or Firm*—Sawyer Law Group, P.C.

(57) ABSTRACT

A mounting rail system for a cabin services system of an aircraft is disclosed. The mounting rail system comprises a mounting rail for providing power, and at least one circuit coupled to the mounting rail for allowing for operation of functionalities of a passenger services unit.

19 Claims, 12 Drawing Sheets

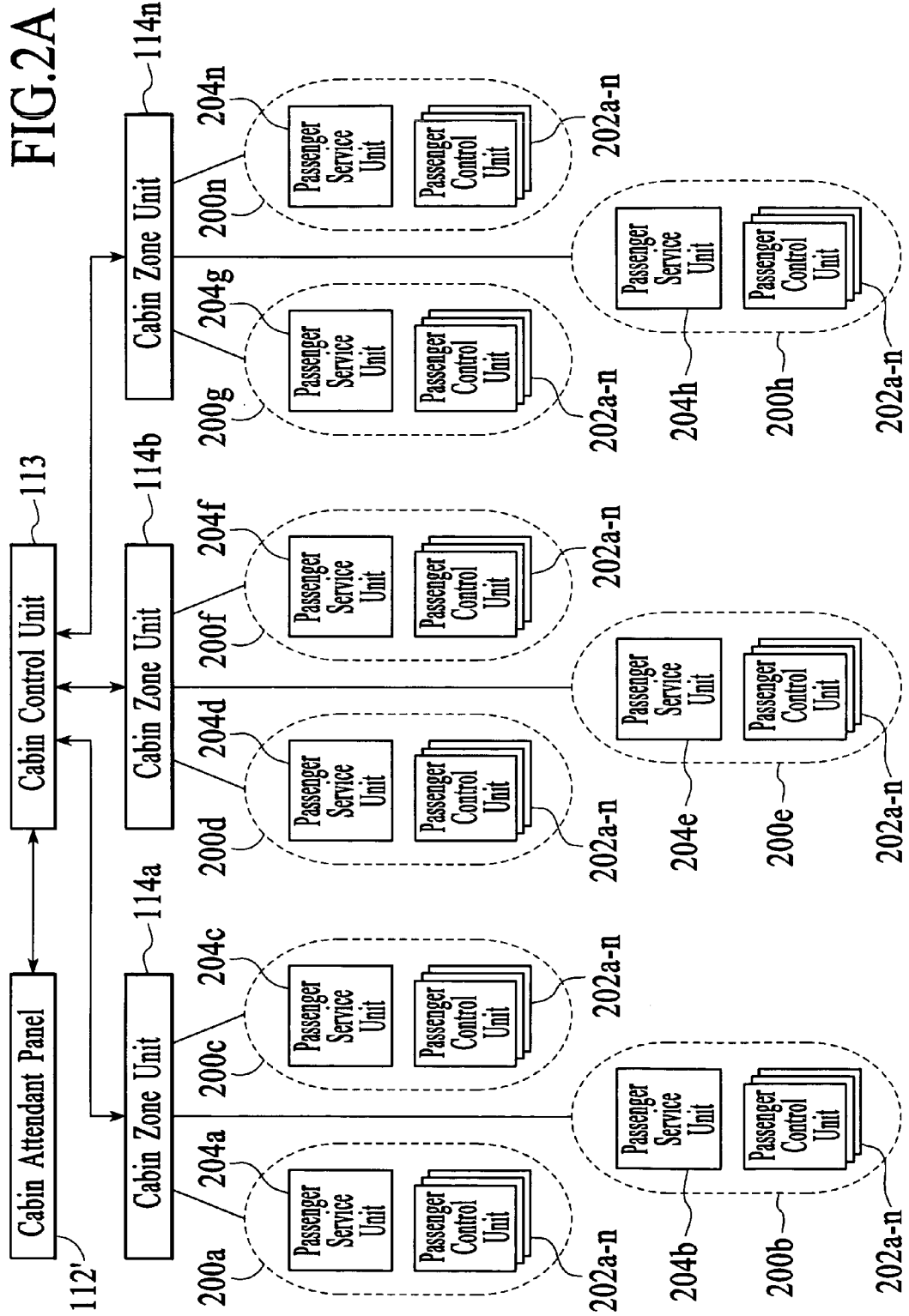

US 7,597,286 B2

SIMPLIFIED POWER SYSTEM FOR A CABIN SERVICES SYSTEM FOR AN AIRCRAFT

FIELD OF THE INVENTION

The present invention relates generally to commercial aircraft and more particularly to a simplified power system for a cabin services system in an aircraft.

BACKGROUND OF THE INVENTION

Commercial aircraft utilize a cabin services system to provide passengers with a number of services. Some of the cabin services address basic needs of the passengers, including air vents (known as "gasper nozzles"), reading lights, attendant-calling functions, emergency oxygen, and signage (e.g., FASTEN SEAT BELTS and NO SMOKING). Other cabin services are designed to enhance the flight experience of the passenger, including in-flight entertainment such as music and video (with either flip-down or seatback screens) and Internet connectivity such as Connexion® by Boeing.

The mechanical, electrical, and pneumatic components that are employed to provide cabin services are packaged together in passenger service units. Each of these service units includes a set of controls for actuating or adjusting the individual cabin services. In narrow-body aircraft, that is, aircraft with a single aisle, the controls for the cabin services are typically located above the seats (i.e., overhead control). In wide-body aircraft, that is, aircraft with two aisles, the controls for the cabin services are typically located above the window seats and in the armrests for the center seats (i.e., armrest control). In addition, in-flight entertainment systems may also include a control box located below the seats.

Conventional cabin services systems require miles of electrical wiring and cable. For overhead controls, the electrical wiring runs through the ceiling or crown of the aircraft. For armrest controls, the electrical wiring runs through the floor. Not only is this wiring system complex, but it also adds substantial weight to an aircraft and occupies valuable space. In addition to wiring complexity, the amount of skilled labor to perform the tedious and demanding installation of the cabin services system—including the ducting for the gasper nozzles—is substantial.

In addition to the burden and complexity of the installation, other factors come into play when designing a passenger services system. For example, airlines desire a passenger services system that is easy to use and ergonomically designed for its passengers. In this regard, the controls for conventional passenger services may often be difficult to reach, particularly for passengers with a seat belt fastened. In addition, which controls correspond to which seat may not be readily apparent.

Conventional passenger services functions are typically integrated with the in-flight entertainment system. The portion of the in-flight entertainment system that provides flight entertainment is not essential; however, the in-flight entertainment system as a whole is considered a basic aircraft function due to the integration of passenger services functions associated therewith. An in-flight entertainment system is generally heavy and is time consuming to install. Additionally, new in-flight entertainment systems evolve frequently. In addition, in-flight entertainment systems are typically complex, highly variable, and generate significant heat. A portion of the in-flight entertainment system development cost involves work to meet cabin services system interfacing requirements. While in-flight entertainment systems are usually furnished by an airline, the costs saved by removing cabin services system interface requirements would be of significant benefit to airline customers, reflecting favorably on the airline brand. In summary, airlines generally must install an in-flight entertainment system in aircraft so that the aircraft can have basic cabin services system functions.

On both widebody and narrowbody aircraft, ducting of a personal air outlet system is typically installed above ceiling panels with short flex hoses that extend to each passenger service unit to support personal air outlet air distribution. This ducting takes up substantial space in the overhead area and requires a flex hose hookup to each passenger service unit upon installation which can be a physically tedious and demanding process for an airline mechanic.

In addition to the continuing desire to provide improved cabin services for passengers, there remains a need in the art for a cabin services system that substantially reduces or minimizes the amount of required wiring and that offers streamlined installation. The present invention meets such a need.

SUMMARY OF THE INVENTION

A mounting rail system for a cabin services system of an aircraft is disclosed. The mounting rail system comprises a mounting rail for providing power, and at least one circuit coupled to the mounting rail for allowing for operation of functionalities of a passenger services unit.

A system and method in accordance with the present invention provides for the following features and advantages: (1) a passenger service unit power rail is integrated with the passenger service unit mounting rail to provide electrical power to the passenger service unit; and (2) individual personal air outlets are installed in the passenger service unit to eliminate ducting of a personal air outlet system, flex hose hookup, and to reduce noise. As a result of these features, a passenger service unit can be quickly installed and maintained without any wire, duct or tube hookups.

BRIEF DESCRIPTION OF THE DRAWINGS

FIG. 2A illustrates a block diagram of a cabin services system in accordance with one of the embodiments.

DETAILED DESCRIPTION

The following description is presented to enable one of ordinary skill in the art to make and use the embodiments of the invention, and is provided in the context of a patent application and its requirements. Various modifications to the embodiments, generic principles, and features described herein will be readily apparent to those skilled in the art. Thus, the present invention is not intended to be limited to the embodiments shown, but is to be accorded the widest scope consistent with the principles and features described herein.

Figure 1:
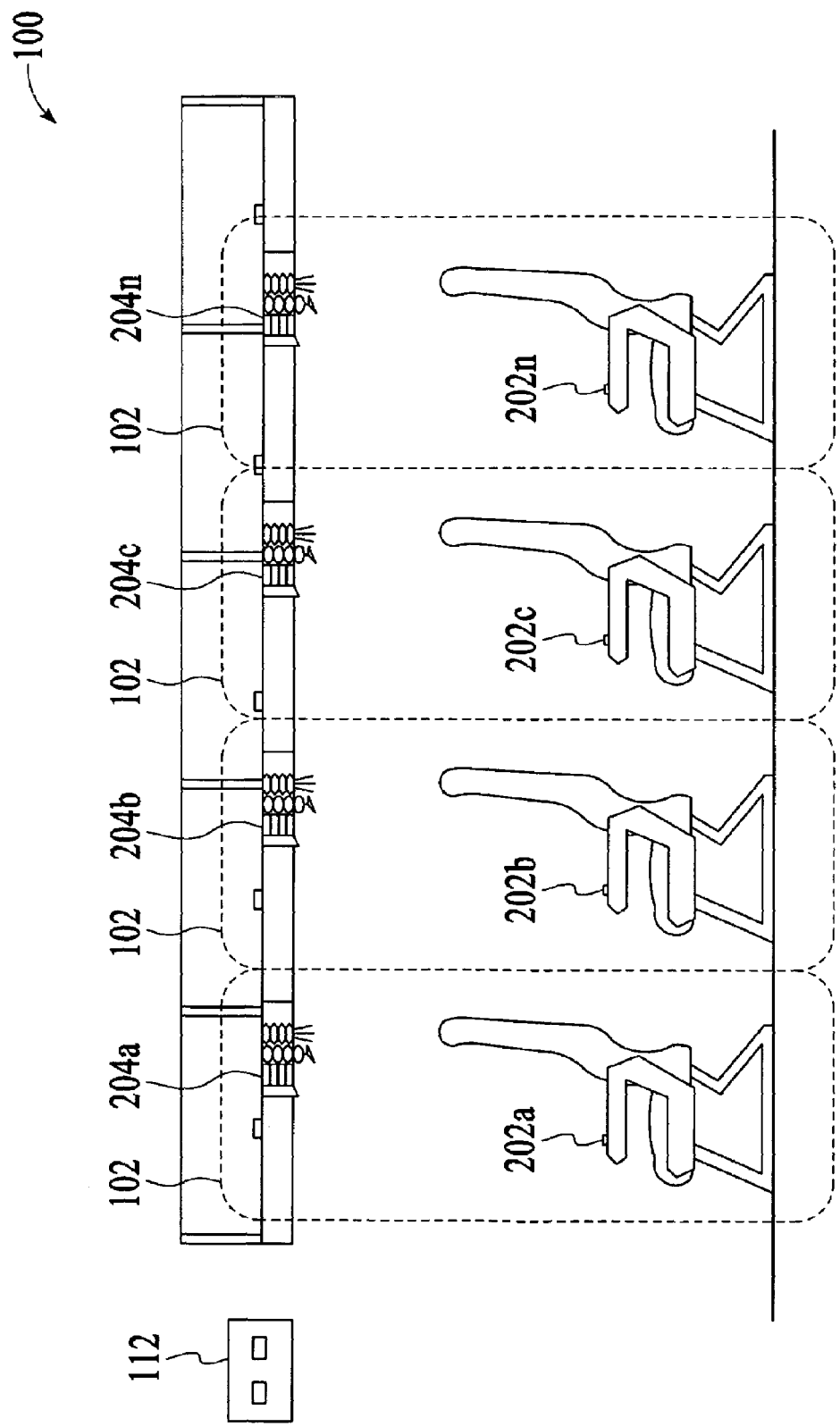
FIG. 1 illustrates a schematic diagram of a cabin services system in accordance with a number of embodiments.

A cabin services system 100 according to a number of embodiments is illustrated in FIG. 1. The cabin services system 100 may include a plurality of wireless networks 102. Each of the wireless networks 102 may transmit and receive passenger services commands. Each of the wireless networks 102 may be preferably associated with a seat group. The cabin services system 100 may further include wireless passenger control units 202a-202n, passenger service units 204a-204n, a plurality of cabin zone units 114, a cabin control unit (not shown) and a cabin attendant panel 112. Each passenger control unit 202a-202n may transmit cabin services system commands to a corresponding passenger service unit 204a-204n. Each passenger service unit 204a-204n may include a wireless receiver (not shown) and a controller (not shown) which are used to control passenger service unit functionality. The cabin services system 100 may further include a passenger service unit power rail (not shown) which is integrated with a passenger service unit mounting rail (not shown) to provide electrical power to each passenger service unit 204a-204n. Finally, individual personal air outlet fans may be installed in each passenger service unit 204a-204n to eliminate flex hose hookups that are typically required in conventional cabin services systems.

Additionally, systems may be greatly simplified, passenger controls may be more easily reached by passengers, and each passenger service unit 204a-204n may be quickly installed and maintained without any wiring or duct hookups.

Similarly, wireless interfaces may be used to provide data or control of other passenger service unit module functions. For example, video monitors mounted onto a passenger service unit may receive video data wirelessly via a cabin wireless network. Also, passenger signage can be controlled (turned on/off or fed content for display) via a wireless interface.

Taken together, these wireless interfaces allow for the elimination of wiring to passenger service unit modules. This leaves electrical power as the electrical interface to each passenger service unit module via the passenger service unit mounting rails themselves and also provides a means for powering non-essential or essential loads on these rails. In one implementation, the passenger service unit mounting rails are energized with electricity such that when a passenger service unit module is clipped to the mounting rail, electrical contact is also made between the passenger service unit module and the mounting rail to provide electrical energy to the passenger service unit module.

The powered passenger service unit rail system is comprised of the following components:

Airplane Wiring

Airplane wiring may consist of four wires:

Two non-essential power wires (typically 115 VAC and current return)

Two essential power wires (typically 28 VDC and current return)

Stow Bin Assembly

A typical commercial stow bin assembly consists of a housing assembly that supports a stow bin, passenger service unit mounting rails and other equipment.

Simplified Overhead Electronics Unit (SOEU)

The simplified overhead electronics unit (SOEU) for the invention performs three functions:

Convert power inputs into a "safe-to-touch" power output (such as 12V DC)

Switch the outputs from being powered by the non-essential power input to being powered by the essential power input whenever the essential bus becomes live Reversing the polarity of the outputs when the essential bus becomes live Note that the simplified overhead electronics unit must perform its functions while maintaining circuit separation between the non-essential and the essential busses at all times.

To describe the features of the present invention in more detail refer now to the following description in conjunction with the accompanying figures.

Cabin Services System (CSS)

In one embodiment, a cabin services system 100' may include a cabin control unit 113 wired to a cabin attendant panel 112' as shown in FIG. 2A. The cabin control unit 113 may be wired to a plurality of cabin zone units 114. The cabin zone units 113 may in turn communicate wirelessly to a plurality of wireless seat group networks 115. Each wireless seat group network 200 may include a plurality of passenger control units 202a-202n that communicate wirelessly with one passenger service unit 204. In this method, data from the cabin attendant panel 112' may be relayed by wiring to the cabin zone unit 114' data and may be transmitted by the cabin zone unit 114' wirelessly to the passenger service unit 204. The wiring from the cabin attendant panel 112' to cabin zone unit 114' may exist for functions other than passenger service functions, (such as general cabin lighting control, cabin air temperature data, zonal attendant call light control and many other functions not related to the passenger service functions) thereby eliminating the need to add extra wire or wireless radio hardware for the cabin attendant panel 112' to passenger service unit 204' communication.

Figure 2B:
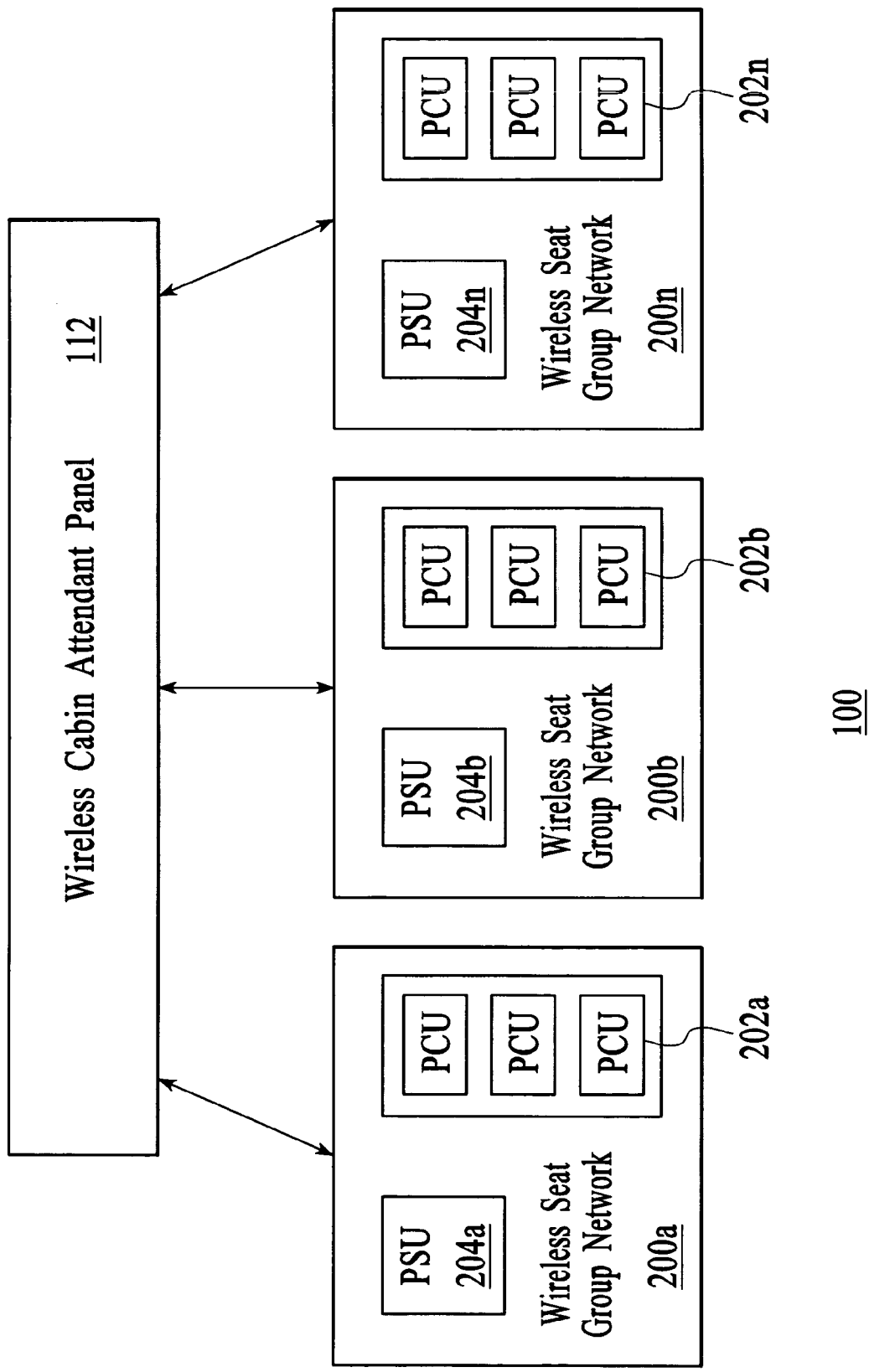
FIG. 2B illustrates a block diagram of an alternate embodiment of a cabin services system in accordance with one of the embodiments.

FIG. 2B illustrates a block diagram of an alternate embodiment of a cabin services system 100". The cabin services system 100" may include a wireless cabin attendant panel 112" that may communicate wirelessly with a plurality of wireless seat group networks. A wireless seat group network 200 may include a plurality of passenger control units 202'a-202'n that may communicate wirelessly with a passenger service unit 204'. This method may allow small commercial aircraft to perform cabin services functions normally found on large commercial aircraft. Further, the wireless cabin attendant panel 112" may wirelessly transmit commands to a plurality of other airplane components in order to control functions such as general cabin lighting, zonal attendant call light, and record cabin air temperature data. Each of the components listed above may be wirelessly enabled to afford this functionality.

Cabin Attendant Panel (CAP)

Figure 2C:
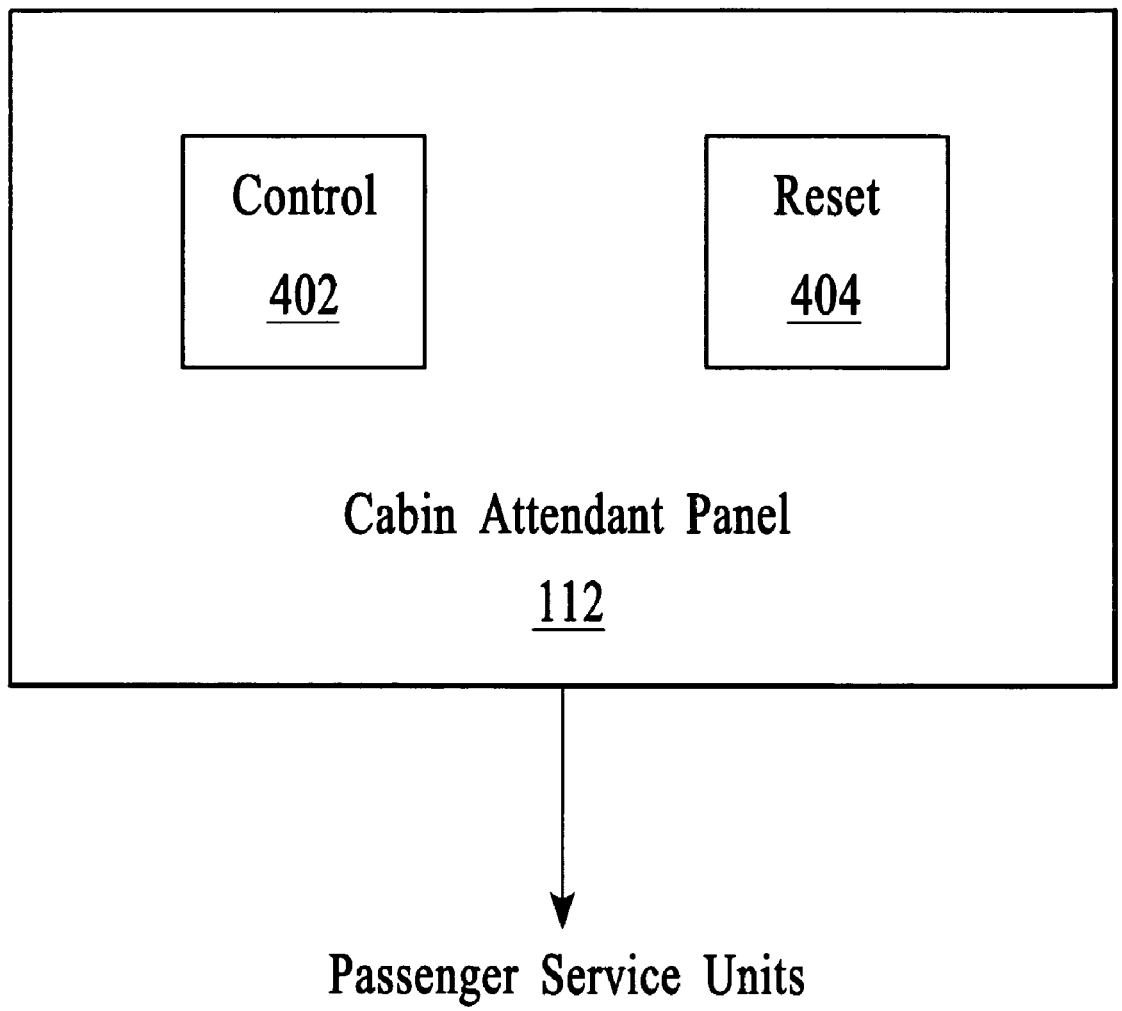
FIG. 2C illustrates one implementation of the cabin attendant panel.

FIG. 2C illustrates one implementation of the cabin attendant panel 112. The wireless cabin attendant panel 112 may be used to transmit wireless control signals via control button 402 directly to groups of passenger service units for functions such as turning on/off passenger signage (e.g., "No Smoking", "Fasten Seat Belt", etc.), and for resetting the passenger service units via reset button 404 during gate turnaround between flights (e.g., turning off all reading lights, personal air outlets, and flight attendant call lights; and turning on all "No Smoking" and "Fasten Seat Belt" signs). In this manner, the cabin control unit and cabin zone module may be bypassed, greatly simplifying the system architecture.

In a preferred implementation of the cabin attendant panel, the cabin attendant panel may make use of other aircraft wireless transmitters located in various positions in the airplane to relay its control signals to the seat group networks.

These other wireless transmitters can include a wireless function added to the cabin zone modules (part of the cabin services system). In this case, the cabin attendant panel may be part of a wired or wireless network common to these zone control electronic boxes. It may also be part of other aircraft systems, such as a wireless cabin network. The cabin attendant panel can further include a display (not shown) for displaying data (e.g., prognostic data) to a mechanic or flight personnel, as described in greater detail below.

Overview of the Wireless Seat Group Network (WSGN) 200

Figure 2D:
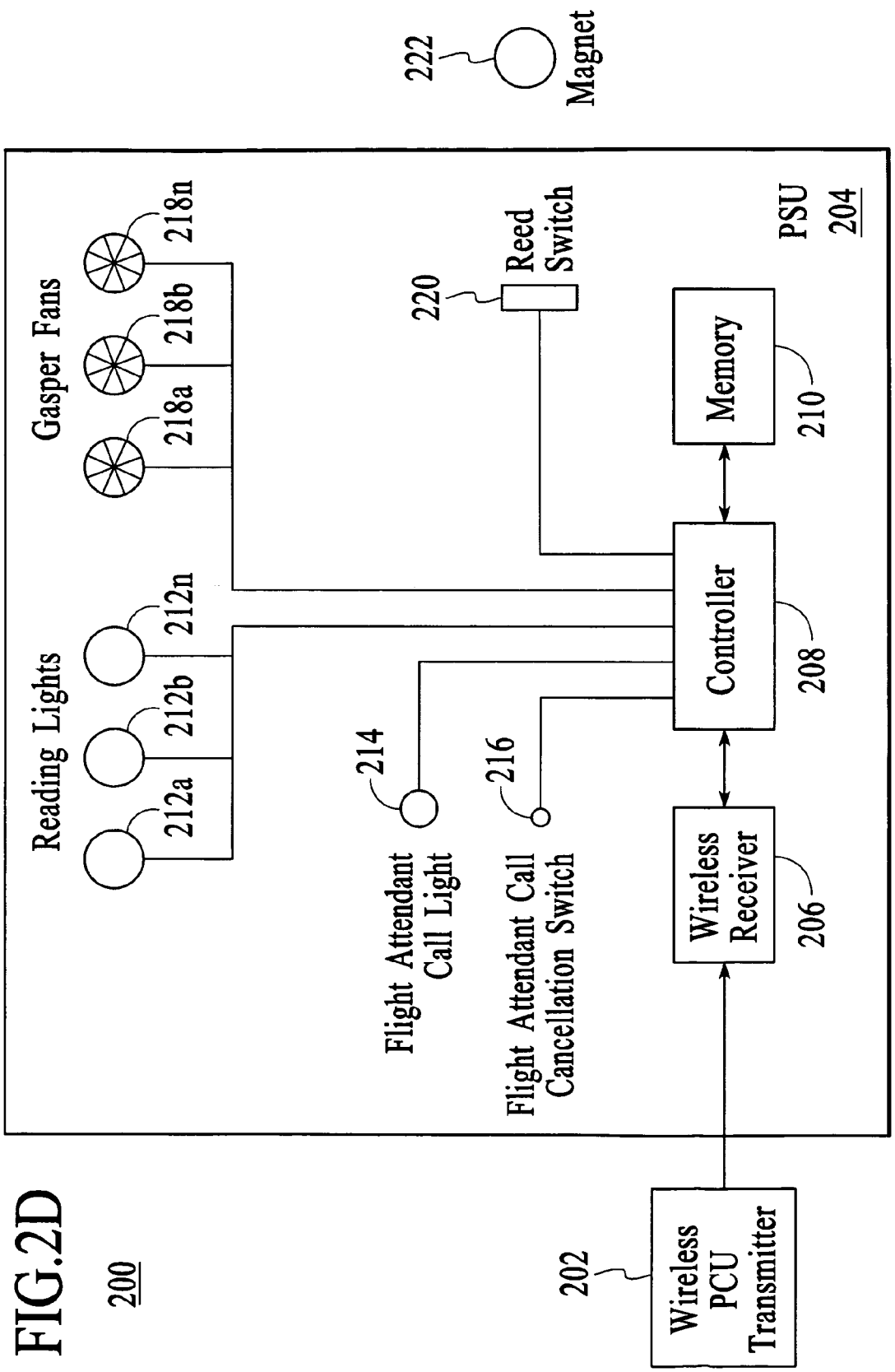
FIG. 2D illustrates the system components for a wireless seat group network in accordance with one of the embodiments.

FIG. 2D illustrates an embodiment of the system components for a wireless seat group network 200. The system components for the embodiment may include one or more wireless passenger control unit transmitters 202, a passenger service unit 204, and a magnet 222. In one implementation, the passenger control unit transmitter 202 may transmit wireless communication to activate a function in an associated passenger service unit 204 as described in greater detail below. In another implementation, the passenger service unit 204 may also receive wireless communication from the cabin attendant panel (not shown).

Passenger Service Unit (PSU) 204

The passenger service unit 204 may comprise a wireless receiver 206, a controller 208, memory 210, reading lights 212a-212n, a flight attendant call light 214, a flight attendant call cancellation switch 216, personal air outlets 218a-218n, and a reed switch 220. The features of each of these components are described in more detail in conjunction with the accompanying figures hereunder.

The wireless passenger control unit transmitter 202 may allow for communication with the passenger service unit 204 without an in-flight entertainment system or any other wires. Thus, the cabin services system is not reliant on an in-flight entertainment system and an aircraft can be built without a conventional in-flight entertainment system. This allows airlines to choose not to install wired in-flight entertainment systems (which significantly reduces weight) or to use the latest portable in-flight entertainment systems, such as the digEplayer or eXpress, on widebody aircraft.

A passenger control unit including the wireless passenger control unit transmitter 202 may be installed anywhere in the passenger seat (seat arm, seat back, etc.) within easy reach of the passenger. Wireless passenger control unit transmitters 202 may be battery powered, or may use energy harvesting for power without batteries. An energy harvesting wireless passenger control unit transmitter may be constructed, for example, by integrating an EnOcean piezoelectric or electro-dynamic wireless transmitter (www.enocean.com, part numbers PTM100 or PTM200) into a passenger control unit such that passenger actuation of the passenger control unit control buttons closes a specific control switch on the EnOcean transmitter and depresses the energy bar, thus resulting in wireless transmission of command telegrams from the passenger control unit to a receiver (for example, an EnOcean receiver—EnOcean P/N RCM 120) mounted in the passenger service unit. The command telegrams may include an identifier unique to the transmitter and indication of which control switch was closed at the time of pressing the energy bar.

Passenger Service Unit (PSU) Functionality

Passenger service unit modules may come in many forms. Any given passenger service unit module may include one or more of the following functionalities:

Flight attendant call light
Reading light
Personal air outlets
Emergency oxygen
In-flight entertainment system control such as video or audio channel selection
Cabin signage such as "fasten seat belt", "no smoking" or other passenger information It should be understood by one of ordinary skill in the art that a variety of other functions could be included and their use would be within the spirit and scope of the present invention.

In one embodiment, each passenger service unit may utilize the following features to allow it to easily snap onto a mounting rail in an aircraft without wire, duct or tube hookups: a 12V DC powered mounting rail, wireless technology, and fans mounted onto a passenger service unit.

Powered mounting rail: the passenger service unit mounting rail provides both a structural interface for installing a passenger service unit as well as an electrical power interface. Each passenger service unit may simply snap onto the mounting rail for both mechanical attachment and for electrical power.

Wireless technology: together, the wireless passenger control unit, wireless interface to the cabin attendant panel and the passenger service unit power rail (or power line) within the mounting rail may eliminate the need to hook up wires to a passenger service unit.

Fans mounted onto a passenger service unit: ducting for a personal air outlet and hookup to each passenger service unit may be replaced by individual personal air outlet fans built into each passenger service unit. This results in less noise (compared to high pressure ducting and nozzles of a conventional personal air outlet).

The reading light, flight attendant call, nozzles and fans of a personal air outlet and emergency oxygen may be assembled in an integrated passenger service unit module that snaps onto the mounting rail without any wire or duct hookups.

In one implementation, fans (mounted onto a passenger service unit) may draw "fresh" air into a passenger service unit plenum through an inlet grill located adjacent to the cabin air distribution nozzles. In such an implementation, ducts of a personal air outlet may be eliminated and cabin noise may be reduced.

In one implementation, oxygen masks may be deployed by turning off power to a utility bus on the passenger service unit mounting rail and momentarily turning on an essential power bus and reversing electrical polarity on a power rail within the passenger service unit mounting rail. Current will then flow through a diode in the oxygen circuit to activate the mask drop solenoid.

Passenger Service Unit (PSU) Mounting Rails

Figure 3:
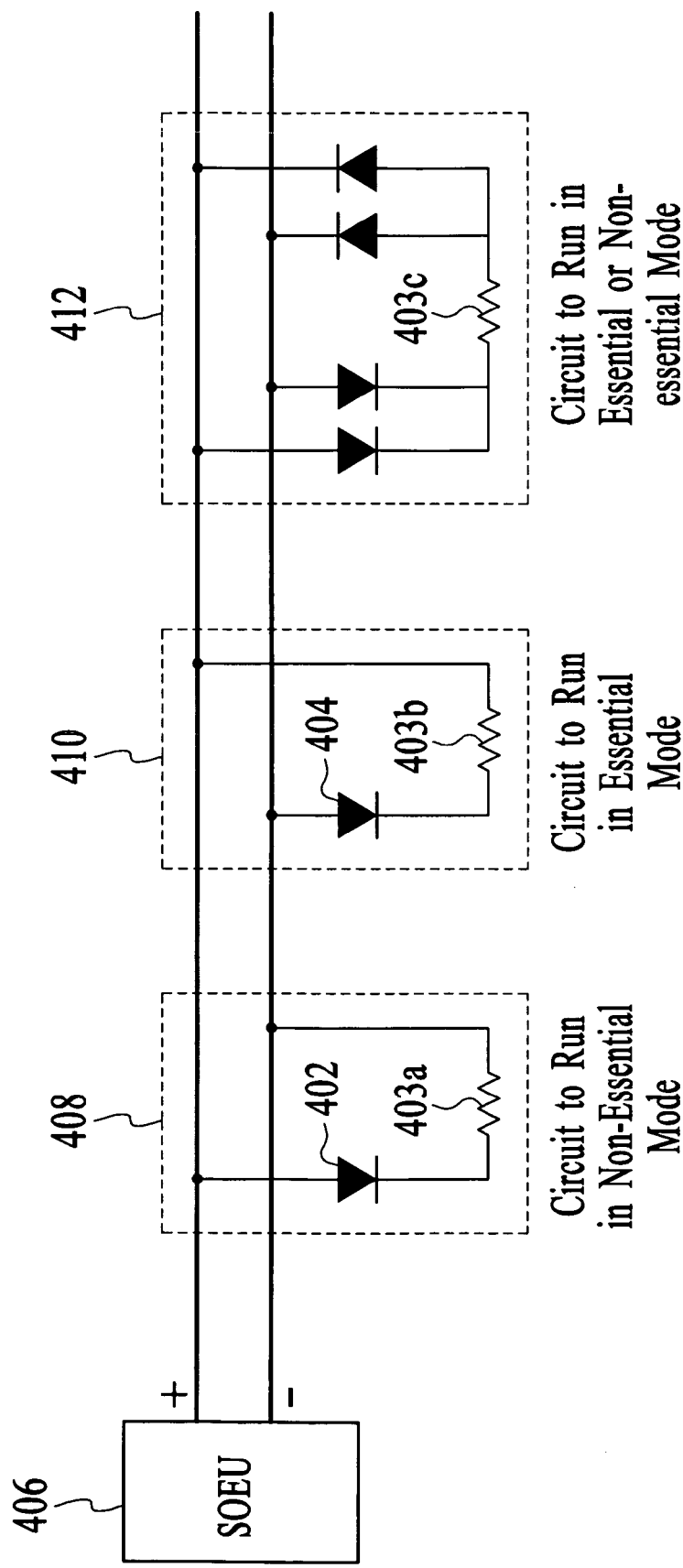
FIG. 3 is a diagram that illustrates the operation of passenger service unit mounting rails with circuits connected thereto.

FIG. 3 is a diagram that illustrates the operation of the passenger service unit mounting rails with passenger service unit circuits as indicated by loads 403a, 403b and 403c connected thereto. As is seen, under normal operating conditions, a diode 402 in series with each passenger service unit module circuit allows current to flow through non-essential circuits 408. Non-essential circuits are, for example, circuits for in-flight entertainment monitors, reading lights and flight attendant call lights. For essential circuits 410, such as one for oxygen deployment, a diode 404 in series prevents current from flowing into the circuit. Thus, under non-normal operating conditions, such as during emergency oxygen deployment, the output of the overhead electronics unit 406 reverts from a non-essential power mode to an essential power mode and the output polarity is reversed. Thus, the diodes 402 on the non-essential circuits prevent current to flow through them while the diodes 404 on the essential circuits now allow current to flow through them. This can be used, for example, to momentarily power a solenoid that opens an oxygen mask door thus allowing oxygen masks to fall into the cabin, or, for example, to continuously power a wirelessly activated oxygen system.

Note that if a circuit 412 requires power during both normal and non-normal conditions, diodes may be used to provide power to the circuit 412 under either condition. Also note that if the circuit 412 could operate with either polarity, no diodes would be necessary and the circuit may be connected to each of the rails.

In one implementation, the 12V DC mounting rail contact and the current return contact may be widely spaced. In this implementation, such a design helps to prevent accidental shorting across the contacts with, e.g., a conductive tool that might otherwise startle a mechanic by discharging sparks. Additionally, all portions of the passenger service unit mounting rails that cannot be contacted by the electrical contact of the passenger service unit may be made from non-conductive materials or finished with non-conductive finishes as another preventive measure against accidental shorting.

The passenger service unit power rail may implement any low voltage power type, AC or DC. Many power rail designs other than that shown in FIG. 3 are feasible. For example, the male spring contact may be moved to the passenger service unit with the female contact inserted into a groove in the mounting rail arm. In this case, both the 12V DC and return rails may be located on the same side of the passenger service unit (instead of opposite sides) since both mounting rail contacts can be recessed protecting them from accidental shorting with, e.g., a conductive tool.

Figure 4:
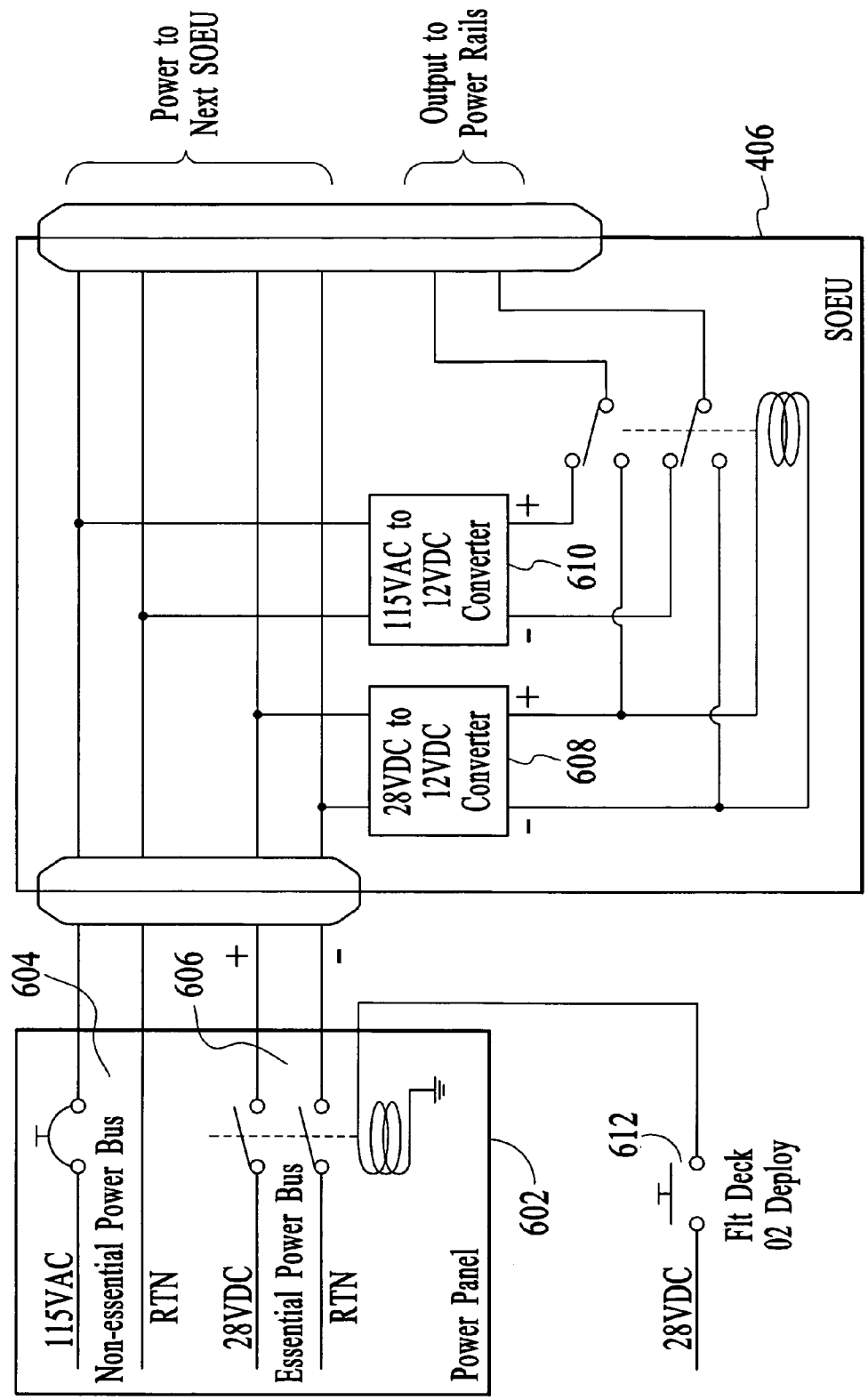
FIG. 4 is an example of a simplified overhead electronics unit.

FIG. 4 is an embodiment of a simplified overhead electronics unit (SOEU) 406. As is seen, a power panel 602 provides power to the simplified overhead electronics unit 406 via a non-essential power bus 604 and/or an essential power bus 606. In this embodiment the non-essential power bus 604 may be 115 VAC and the essential power bus 606 may be 28 VDC. The simplified overhead electronics unit 406 may include a first converter 608 for converting the essential voltage from in this embodiment 28 VDC to 12 VDC and a second converter 610 for converting the essential voltage bus from 115 VAC to 12 VDC. The simplified overhead electronics unit 406 may be typically mounted on the stow bin assembly. In this example, only power from the non-essential power bus inputs are being used to create the 12 VDC output under normal operating conditions (when the essential bus 606 is not live). When the essential power bus 606 becomes live, a relay may be energized to switch the output from being driven by the non-essential power bus 604 to being driven by the essential power bus 606 input. Note that the output polarity will be reversed relative to the normal operating condition when this occurs.

In this example:

The non-essential power bus 604 may be 115 VAC and may be transformed to 12 VDC by an AC-to-DC converter 610 within the simplified overhead electronics unit 406.

The non-essential power bus 604 may also be turned off without turning on the essential power bus 606 by opening a circuit breaker or relay, typically located in a power panel.

The essential power bus 606 may be 28 VDC and may be converted to 12 VDC by a DC-to-DC converter 608 within the simplified overhead electronics unit 406.

The essential power bus 606 may typically be turned on via a relay typically located in a power panel. The relay may, for example, be activated by a switch 612 in the Flight Deck, such as for emergency oxygen deployment.

The power buses may be fed through the simplified overhead electronics unit 406 for installation convenience. This may allow several simplified overhead electronic units 406 to be daisy chained together down the airplane.

There are several ways to accomplish the simplified overhead electronics unit 406 functionality. The example circuit shown in FIG. 4 is just one way to implement this function.

Passenger Service Unit Mounting Rail

Figure 5:
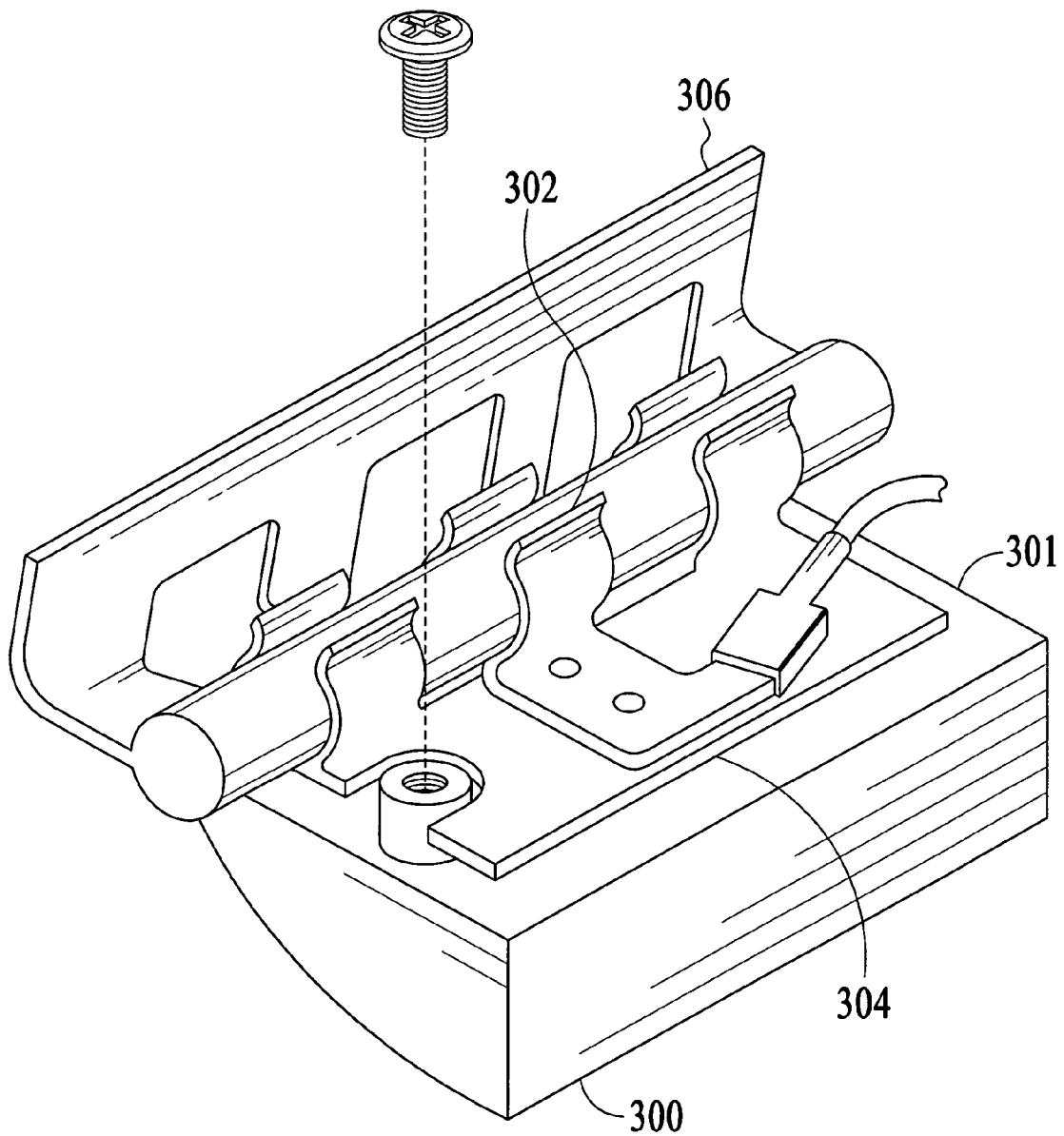
FIG. 5 is a perspective view of a portion of a passenger service unit module.

FIG. 5 is a perspective view of a portion of the passenger service unit module 300. The portion of the passenger service unit module 300 illustrated in FIG. 5 shows an electrical contact assembly 301. The assembly 301 may comprise an electrical spring contact 302 and a plastic, non-conductive, insulating support 304. The electrical spring contact 302 may be made of, for example, beryllium copper that is nickel and gold plated. The electrical spring contact 302 may be designed to clip onto the round portion of electrically conductive passenger service unit mounting rail 306. The plastic support 304 may be also designed to clip onto the passenger service unit mounting rail 306 and may be intended to support the electrical spring contact 302 and to prevent the electrical spring contact 302 from rocking back and forth on the passenger service unit mounting rail 306. The electrical contact assembly 301 may be loosely fastened to a passenger service unit module such that when a passenger service unit module vibrates under the passenger service unit mounting rail 306, the electrical spring contact 302 will float over the passenger service unit module and maintain its grip on the passenger service unit mounting rail 306. With these elements in place, the electrical spring contact 302 may mate with the electrically conductive portion of the passenger service unit mounting rail 306 when the passenger service unit is installed and held in place by the passenger service unit catches (not shown).

Accordingly, each passenger service unit module 300 may receive electrical power from the mounting rail 306 via its electrical spring contacts 302.

Passenger service unit mounting rails may be typically constructed from an aluminum extrusion that is approximately the same length as the stow bin assembly. In this embodiment the mounting rails may have the following features:

Each rail may be electrically connected to one of the outputs from the simplified overhead electronics unit 406 via a wire. Thus, one rail may be connected to the normally positive DC output and the other rail may be connected to the normally negative DC output.

The edge of the rail that passenger service unit module clips may attach to is kept electrically conductive. While most surfaces of the rail are typically primed and painted, the aluminum rail along this edge may be plated, for example, with nickel and gold to provide electrical conduction.

Note that the simplified overhead electronics unit above may energize these rails with 12 VDC voltage.

In a system and method in accordance with the present invention the passenger service unit mounting rails may perform two functions:

(1) Mechanical support of the passenger service unit modules; and (2) Electrical supply to the passenger service unit modules.

This may minimize the addition of new components or weight to the airplane. However, because of this dual functionality, electrical isolation may be required between the rail and any adjacent conductive airplane parts. Thus, plastic bushings may likely be used at the rail mounting points.

When combined with a wireless data infrastructure, the mounting rails may greatly simplifies the passenger service unit installation by providing electrical power to passenger service unit modules via the passenger service unit mounting rails instead of through electrical wiring. With no data or power wiring interfaces, passenger service unit modules may be able to be installed, removed or relocated much more rapidly.

Detail of Oxygen Deployment System

What follows is a more detailed description of a simple supplemental oxygen system for a wireless passenger service unit as described above. In this system, the passenger service unit may be mounted on the electrically powered passenger service unit rails.

Figure 6:
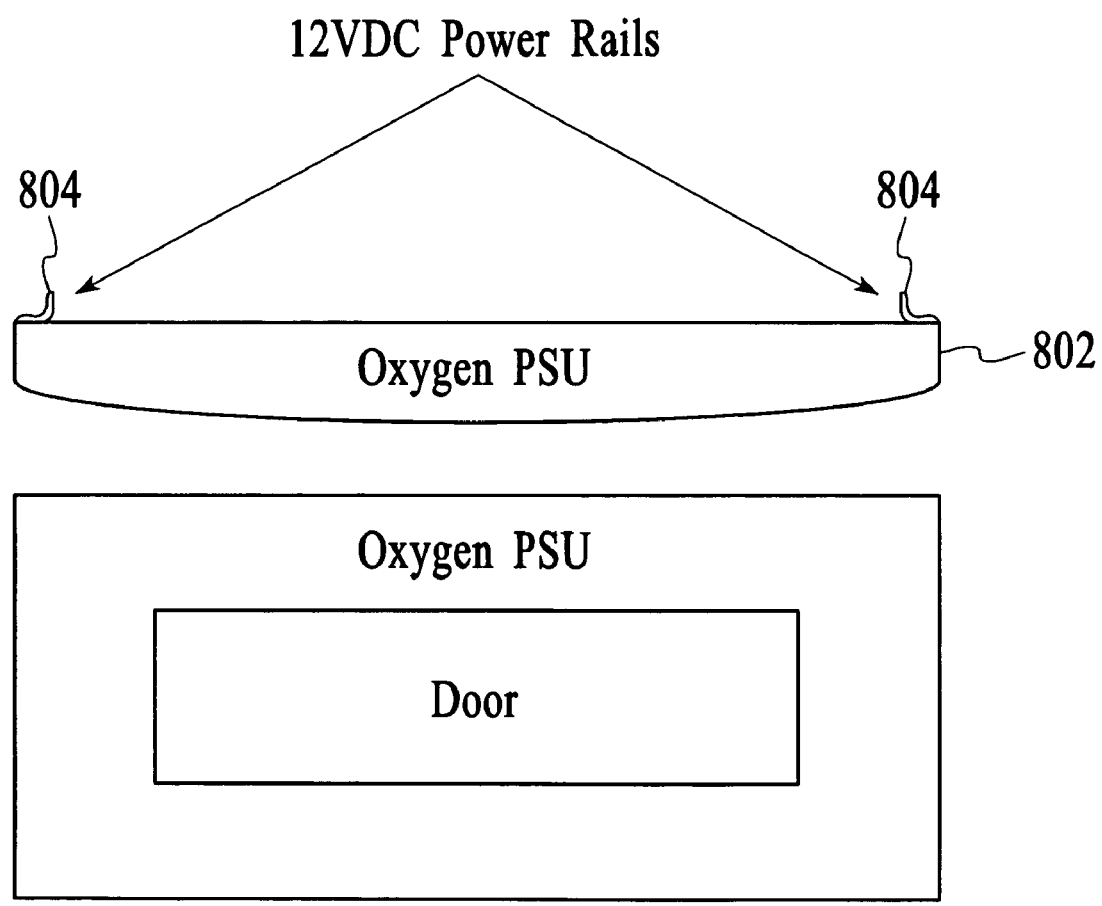
FIG. 6 shows an oxygen passenger service unit mounted to passenger service unit rails.
Figure 7:
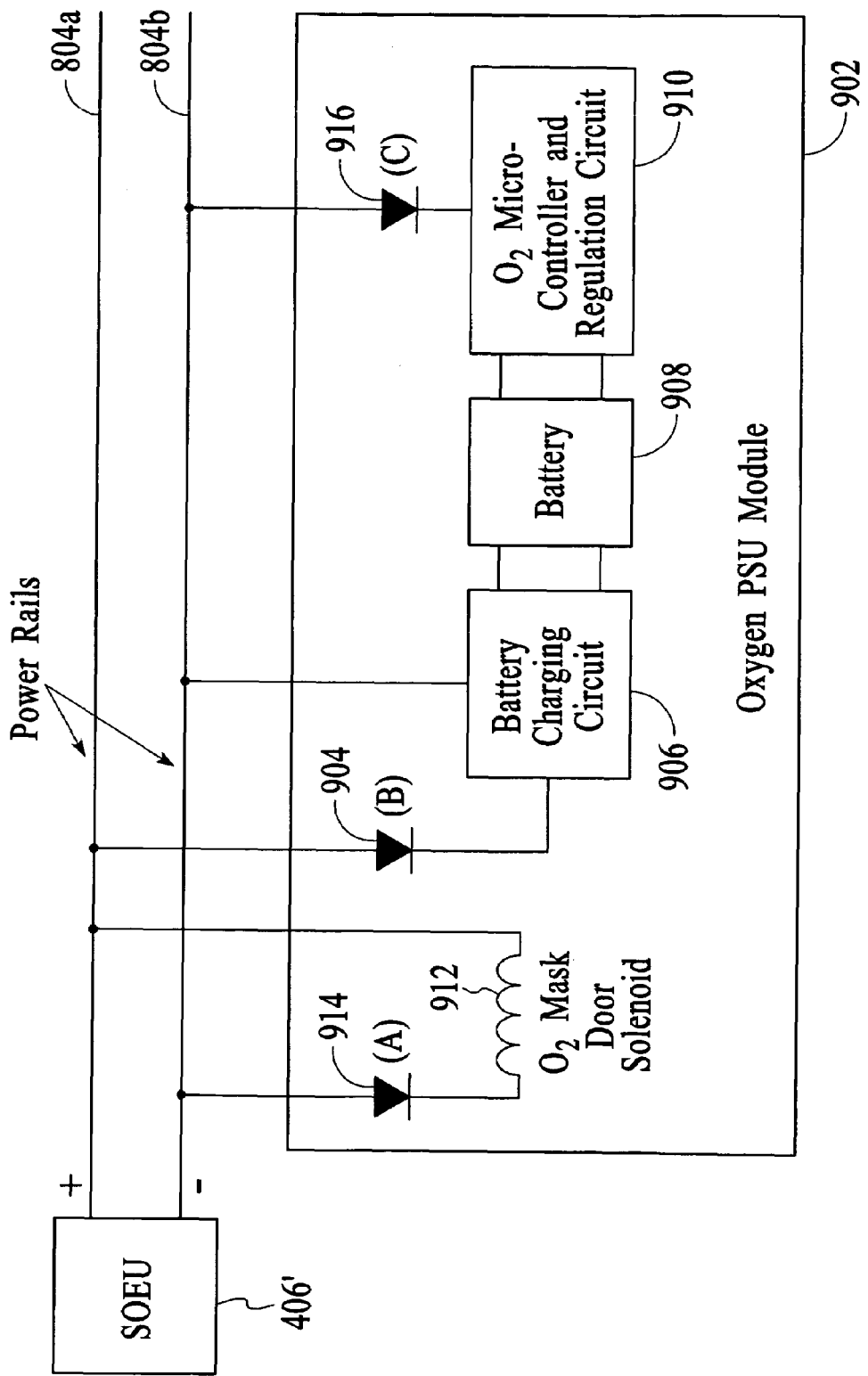
FIG. 7 shows a battery charging circuit within the oxygen passenger service unit module powered directly from the 12 VDC rail, with a diode in series to prevent operation if the polarity is reversed.

FIG. 6 shows an oxygen passenger service unit 802 mounted to passenger service unit rails 804. FIG. 7 shows the output from the simplified overhead electronics unit 406' in normal operating condition.

Referring to FIG. 7, in normal operation a battery charging circuit 906 within the oxygen passenger service unit module 902 may be powered directly from the 12 VDC rail 804a and 804b, with a diode 904 in series to prevent operation if the polarity is reversed. This circuit 906 may charge a battery 908 that in turn may power other emergency oxygen functions in the passenger service unit such as a microcontroller and oxygen regulation circuits 910.

The supplemental oxygen mask door latch solenoid 912 may also be wired to the 12 VDC rail 804a and 804b; however, the door latch solenoid 912 may be prevented from firing by the use of a series diode 914 in the circuit. The diode 914 may be placed in series with the solenoid 912 such that it may not be powered during normal polarity.

Reversing the polarity on the power rails 804a and 804b may cause the solenoid 912 to actuate, opening the passenger service unit door (not shown) and allowing the oxygen masks (not shown) to drop. The diode 904 in the battery charging circuit 906 may block current, preventing damage to the battery charging circuit 906. Note that if the airplane power supply (from the simplified overhead electronics unit) is completely shut off, the oxygen microcontroller and regulation circuit 910 may be driven by the battery 908.

A wireless interface (not shown) from the airplane may be provided to the oxygen microcontroller and regulation circuit 910 to initiate and regulate the flow of oxygen. Alternatively, a discrete circuit from the normally negative passenger service unit rail 804b through a diode 916 may be provided to the microcontroller 910 to inform it that the masks have been deployed (such that, for example, it could arm the oxygen supply or begin listening for wireless control signals from the airplane).

Figure 8:
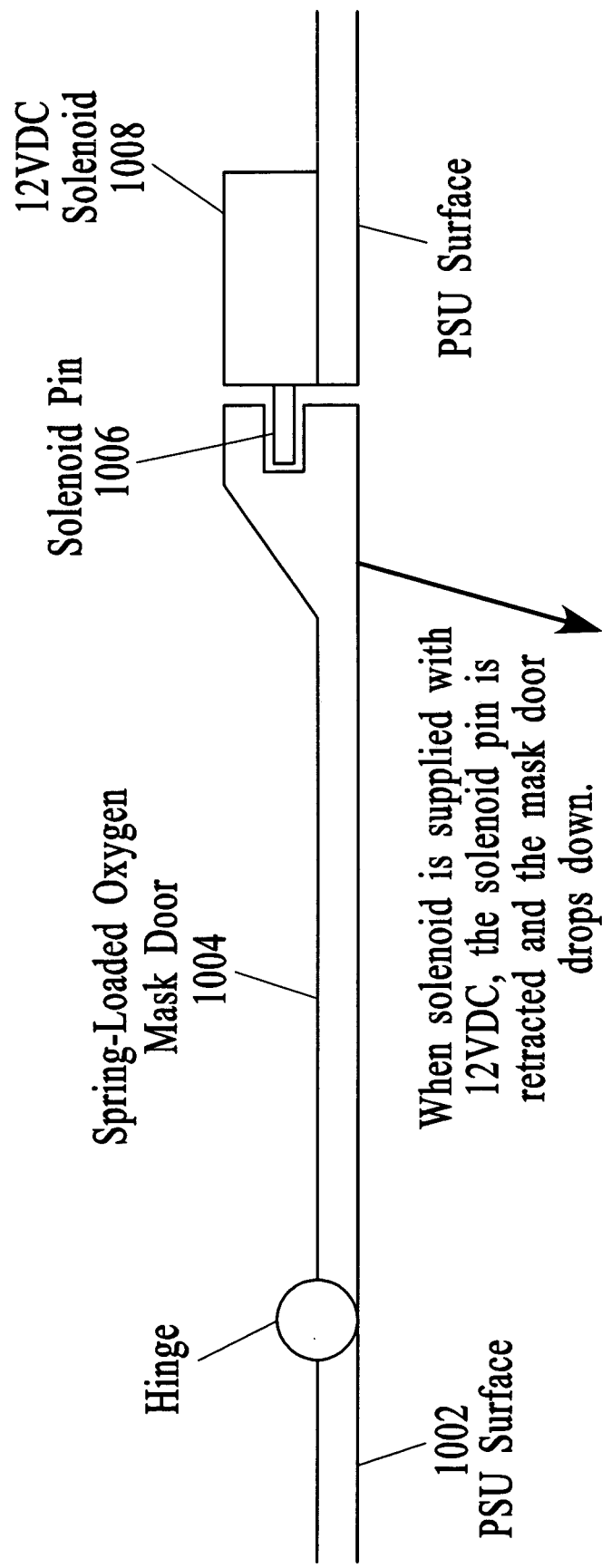
FIG. 8 shows the design of the oxygen mask door latching mechanism.

FIG. 8 is an embodiment of the oxygen mask door latching mechanism 1000. As is seen therein, there is a passenger service unit surface 1002 which may be coupled to a spring-loaded oxygen mask door 1004 which may be held in place by a solenoid pin 1006. When the solenoid 1008 is supplied with 12 VDC, the solenoid pin 1006 may be retracted and the mask door 1004 may drop down.

As a further refinement, the above supplemental oxygen system may be powered from the rail using a diode bridge, such that the supplemental oxygen is powered in either forward OR reverse polarity, while the non-essential functions are powered only in forward polarity. As before, the system may be connected to the utility bus in forward polarity, and to an essential bus in reverse polarity. This method would be useful for enabling the supplemental oxygen to perform maintenance diagnostic functions like BITE (Built-In Test Equipment) and prognostic reporting to a maintenance computer.

More generally, a system and method in accordance with the embodiments may apply to any two or more systems or components powered from a single bus, such that the bus may be powered from one power source in forward polarity and a different power source in reverse polarity, and such that certain of these systems or components may be shared when the polarity is reversed.

As shown above, the higher criticality system may be powered momentarily (to briefly energize an oxygen door latch solenoid), continuously when reversed (to power an oxygen system only after deployment), or it may be powered continuously from the non-essential bus in forward polarity, and the essential bus when reversed.

This concept may find application in any DC powered system which requires partial load-shedding when non-essential power is shut down.

Other Embodiments

Many other embodiments of this system are possible:

The system described above and illustrated in FIG. 4 shows a two wire non-essential power bus and a two wire essential power bus as power inputs to the simplified overhead electronics unit where the essential power bus is normally turned off and where, when the essential power bus is turned on, a relay in the simplified overhead electronics unit powers its output from the essential bus with reverse polarity. An alternative embodiment may be to allow both buses to be live during normal operation and to trigger the relay within the simplified overhead electronics unit directly from an oxygen deploy switch via a fifth wire to the simplified overhead electronics unit.

Figure 9:
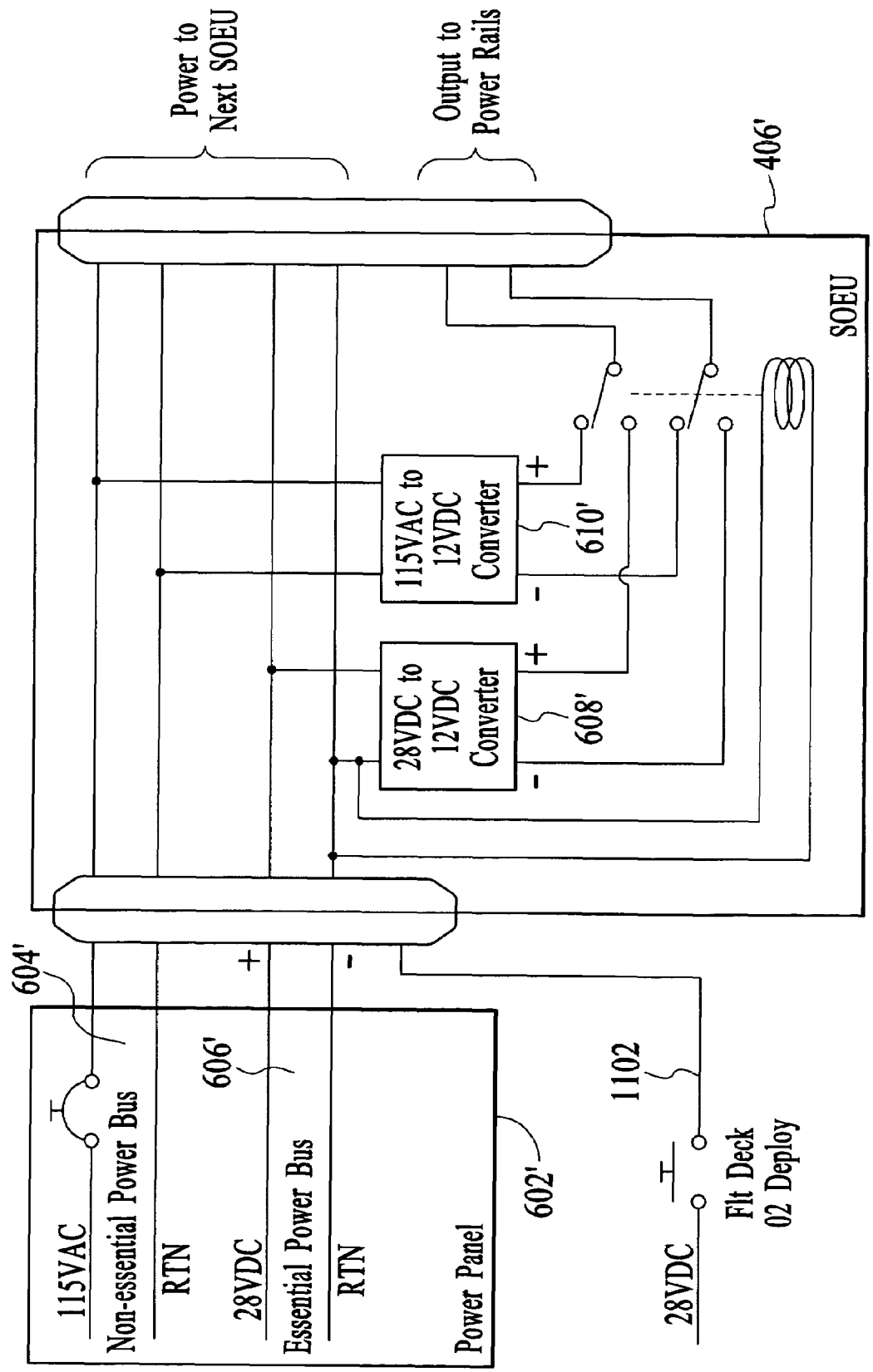
FIG. 9 illustrates the use of the discrete signal at the simplified overhead electronics unit to trigger reversal of polarity on the simplified overhead electronics unit outputs.

FIG. 9 illustrates the use of the discrete signal 1102 from the simplified overhead electronics unit to trigger reversal of polarity on the simplified overhead electronics unit outputs.

In addition, separate power rails may be added to the stowage bin assembly, parallel to the passenger service unit mounting rails, in order to provide the electrical power function.

This system does not rely on wireless data communication to the passenger service unit modules. Other communication options may include traditional wires or communications over power line (COPL) technologies.

Circuits that need to operate when power is completely shut off from the rails may include a battery or capacitor that is charged via the rails during normal operation. This will likely be the case for powering the microcontroller in the oxygen passenger service unit as illustrated in FIG. 7.

The power rail may use any of low voltage power type, AC or DC. Many power rail and electrical contact designs other than that shown in FIG. 5 are feasible.

Portable In-Flight Entertainment Systems

Airline customers benefit through improved maintenance and cabin reconfigurability. Passenger service units can be more easily removed, installed and relocated without wire or duct hookups. Passenger control units do not require any seat arm wiring which is generally subject to damage as such wiring typically passes through seat arm hinges.

A system and method in accordance with the embodiment provides a passenger service unit power rail is integrated with the passenger service unit mounting rail to provide electrical power to the passenger service unit. As a result, a simplified system for powering the cabin of an aircraft is provided.

Although the present invention has been described in accordance with the embodiments shown, one of ordinary skill in the art will readily recognize that there could be variations to the embodiments and those variations would be within the spirit and scope of the present invention. For example, implementations of a cabin services system described above can be implemented in any type of commercial vehicles including, e.g., helicopters, passenger ships, automobiles, and so on. Accordingly, many modifications may be made by one of ordinary skill in the art without departing from the spirit and scope of the appended claims.

What is claimed is:

1. A mounting rail system for a cabin services system of an aircraft, the mounting rail system comprising:

a mounting rail having an electrically conductive portion for providing both electrical power to a passenger service unit and structural support for the passenger service unit; and at least one circuit coupled to the mounting rail for allowing for operation of functionalities of a passenger services unit the mounting rail further comprising a plurality of openings that receive a non-conductive support that clips onto the electrically conductive portion of the mounting rail.

2. The mounting rail system of claim 1 wherein the at least one circuit comprises:
a simplified overhead electronics unit (SOEU);
a first electrical circuit coupled to the mounting rail and the SOEU for allowing operation of essential functions while electrically connected to the mounting rail; and
a second electrical circuit coupled to the mounting rail and the SOEU for allowing operation of non-essential functions while electrically connected to the mounting rail.

3. The mounting rail system of claim 2 wherein the SOEU comprises:
a first converter for providing power to the mounting rail for the electrical circuit; and
a second converter for providing power to the mounting rail for the second electrical circuit.

4. The mounting rail system of claim 2, wherein the first electrical circuit and the second electrical circuit operate alternately based upon a polarity of the power of the mounting rail, and wherein the SOEU utilizes a discrete signal to trigger a reversal of polarities.

5. The mounting rail system of claim 2 wherein the SOEU provides power to an oxygen passenger service unit module, wherein the oxygen passenger service unit module comprises:
a battery charging circuit coupled to the battery and the mounting rail for charging the battery during normal operation, the battery charging circuit being protected by a first diode;
an emergency oxygen function coupled to the battery, the emergency oxygen function being protected by a second diode; and
an oxygen mask door latch solenoid coupled to the mounting rail which is powered during non-normal operation.

6. The mounting rail system of claim 1 further comprising an electrical spring contact that clips onto the electrically conductive portion of the mounting rail.

7. The mounting rail system of claim 1 wherein the non-conductive support that clips onto the electrically conductive portion of the mounting rail, supports both an electrical spring contact and the passenger service unit.

8. A passenger services system for an aircraft comprising:
a passenger service unit for communicating wirelessly with the cabin attendant panel;
a passenger control unit for communicating wirelessly with the passenger service unit; and
a mounting rail system coupled to the passenger service unit, the mounting rail system comprising:
a mounting rail having an electrically conductive portion for providing both electrical power to a passenger service unit and structural support for the passenger service unit; and
at least one circuit coupled to the mounting rail for allowing for operation of functionalities of a passenger services unit the mounting rail further comprising a plurality of openings that receive a non-conductive support that clips onto the electrically conductive portion of the mounting rail.

9. The passenger services system of claim 8 wherein the at least one circuit comprises:
a simplified overhead electronics unit (SOEU);
a first electrical circuit coupled to the mounting rail and the SOEU for allowing operation of essential functions while electrically connected to the mounting rail; and
a second electrical circuit coupled to the mounting rail and the SOEU for allowing operation of non-essential functions while electrically connected to the mounting rail.

10. The passenger services system of claim 9 wherein the first electrical circuit and the second electrical circuit operate alternately based upon the polarity of the power of the mounting rail.

11. The passenger services system of claim 10 wherein the SOEU utilizes a discrete signal to trigger the reversal of polarities.

12. The passenger services system of claim 9 wherein the first electrical circuit and the second electrical circuit operate concurrently.

13. The passenger services system of claim 9 wherein the SOEU comprises:
a first converter for providing power to the mounting rail for the electrical circuit; and
a second converter for providing power to the mounting rail for the second electrical circuit.

14. The passenger services system of claim 9 wherein the SOEU provides power to an oxygen passenger service unit module.

15. The passenger services system of claim 14 wherein the oxygen passenger service unit module comprises:
a battery charging circuit coupled to the battery and the mounting rail for charging the battery during normal operation, the battery charging circuit being protected by a first diode;
an emergency oxygen function coupled to the battery, the emergency oxygen function being protected by a second diode;
an oxygen mask door latch solenoid coupled to the mounting rail which is powered during non-normal operation.

16. A wireless passenger service network for providing cabin services in an aircraft, the network comprising:
a service unit including:
a wireless receiver;
a controller operatively connected to the wireless receiver; and
a plurality of cabin service elements operatively connected to the controller and each configured to provide a cabin service; and
a control unit including:
a plurality of switches corresponding to a respective plurality of the cabin service elements;
a wireless transmitter operatively connected to the switches and configured to transmit a control signal to the wireless receiver of the service unit when one of the switches is actuated to cause the controller to actuate the service element corresponding to the actuated switch; and
a mounting rail system comprising:
a mounting rail having an electrically conductive portion for providing both electrical power to a passenger service unit and structural support for the passenger service unit; and
at least one circuit coupled to the mounting rail for allowing for operation of functionalities of the service unit the mounting rail further comprising a plurality of openings that receive a non-conductive support that clips onto the electrically conductive portion of the mounting rail.

17. An aircraft comprising a plurality of wireless passenger service networks each configured to provide cabin services and each including:
a service unit including a wireless receiver; a controller operatively connected to the wireless receiver; and a plurality of cabin service elements operatively connected to the controller and each configured to provide a cabin service; and a control unit including:

a plurality of switches corresponding to a respective plurality of the cabin service elements;

a wireless transmitter operatively connected to the switches and configured to transmit a control signal to the wireless receiver of the service unit when one of the switches is actuated to cause the controller to actuate the cabin service element corresponding to an appropriate activated switch; and a mounting rail system comprising:

a mounting rail having an electrically conductive portion for providing both electrical power to a passenger service unit and structural support for the passenger service unit; and at least one circuit coupled to the mounting rail for allowing for operation of functionalities of the service unit the mounting rail further comprising a plurality of openings that receive a non-conductive support that clips onto the electrically conductive portion of the mounting rail.

18. An aircraft comprising a cabin services system configured to provide cabin services and including:

a plurality of wireless networks each including a passenger service unit having a plurality of cabin service elements each configured to provide a cabin service;

a cabin attendant panel in wireless communication with the plurality of wireless networks and configured to control at least one of the cabin service elements; and a mounting rail system comprising:

a mounting rail having an electrically conductive portion for providing both electrical power to a passenger service unit and structural support for the passenger service unit; and at least one circuit coupled to the mounting rail for allowing for operation of functionalities of a passenger service unit the mounting rail further comprising a plurality of openings that receive a non-conductive support that clips onto the electrically conductive portion of the mounting rail.

19. A method of manufacturing an aircraft, the method comprising:

installing a mounting rail system; the mounting rail system comprising:

a mounting rail having an electrically conductive portion for providing both electrical power to a passenger service unit and structural support for the passenger service unit; and the mounting rail further comprising a plurality of openings that receive a non-conductive support that clips onto the electrically conductive portion of the mounting rail at least one circuit coupled to the mounting rail for allowing for operation of functionalities of a wireless passenger service unit;

installing a plurality of wireless passenger service units each including a plurality of cabin service elements configured to respectively provide a plurality of cabin services, wherein the service units are installed such that the service elements are in operative proximity with a respective seat of the aircraft; and installing a plurality of wireless passenger control units each including a plurality of switches respectively corresponding to a respective plurality of the cabin service elements, wherein the passenger control units are installed in operative proximity with a corresponding plurality of seats and in wireless operative proximity with a respective one of the passenger service units.

* * * * *

UNITED STATES PATENT AND TRADEMARK OFFICE
CERTIFICATE OF CORRECTION

| | |
|---|---|
| PATENT NO. | : 7,597,286 B2 |
| APPLICATION NO. | : 11/303498 |
| DATED | : October 6, 2009 |
| INVENTOR(S) | : Callahan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-eighth Day of September, 2010

David J. Kappos
*Director of the United States Patent and Trademark Office*